United States Patent
Sishtla et al.

(10) Patent No.: US 11,105,203 B2
(45) Date of Patent: Aug. 31, 2021

(54) HIGH EFFICIENCY CENTRIFUGAL IMPELLER WITH BALANCING WEIGHTS

(71) Applicant: Carrier Corporation, Palm Beach Gardens, FL (US)

(72) Inventors: Vishnu M. Sishtla, Manlius, NY (US); Jing Chen, Charlotte, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 169 days.

(21) Appl. No.: 16/216,547

(22) Filed: Dec. 11, 2018

(65) Prior Publication Data
US 2019/0234216 A1 Aug. 1, 2019

Related U.S. Application Data

(60) Provisional application No. 62/623,298, filed on Jan. 29, 2018.

(51) Int. Cl.
| | |
|---|---|
| *F01D 5/02* | (2006.01) |
| *F04D 29/66* | (2006.01) |
| *F04D 29/28* | (2006.01) |
| *F04D 29/051* | (2006.01) |
| *F01D 5/10* | (2006.01) |
| *F16F 15/32* | (2006.01) |
| *F16F 15/34* | (2006.01) |

(52) U.S. Cl.
CPC .............. *F01D 5/027* (2013.01); *F01D 5/10* (2013.01); *F04D 29/051* (2013.01); *F04D 29/284* (2013.01); *F04D 29/662* (2013.01); *F16F 15/322* (2013.01); *F16F 15/34* (2013.01); *F05D 2220/36* (2013.01); *F05D 2230/60* (2013.01); *F05D 2250/281* (2013.01); *F05D 2260/15* (2013.01); *F05D 2260/96* (2013.01)

(58) Field of Classification Search
CPC .......... F01D 5/027; F01D 5/10; F04D 29/284; F04D 29/051; F04D 29/662; F04D 29/666; F04D 29/66; F16F 15/322; F16F 15/34; F16F 15/28
USPC ......................................... 416/144
See application file for complete search history.

(56) References Cited

U.S. PATENT DOCUMENTS

| | | | |
|---|---|---|---|
| 2,625,884 A | 1/1953 | Welsh | |
| 2,964,972 A * | 12/1960 | Jameson | F01D 5/027 |
| | | | 464/180 |

(Continued)

FOREIGN PATENT DOCUMENTS

| | | | |
|---|---|---|---|
| DE | 102011000208 A1 | 7/2012 | |
| EP | 1052424 A2 * | 11/2000 | F01D 5/027 |

(Continued)

OTHER PUBLICATIONS

Extended European Search Report; International Application No. 19153993.1; International Filing Date: Jan. 28, 2019; dated May 24, 2019; 8 pages.

(Continued)

*Primary Examiner* — J. Todd Newton
(74) *Attorney, Agent, or Firm* — Cantor Colburn LLP

(57) ABSTRACT

A balancing weight mountable within a balance hole of a rotary component includes a cylindrical body having a desired weight. An opening is formed in a portion of the body to define a hollow passageway and a mechanism couples the cylindrical body within an interior of the balance hole.

19 Claims, 5 Drawing Sheets

(56) References Cited

U.S. PATENT DOCUMENTS

| | | | | |
|---|---|---|---|---|
| 3,208,395 | A | * | 9/1965 | Budzich ................ F04B 1/2071 91/489 |
| 3,736,811 | A | * | 6/1973 | Neary .................... F16F 15/34 464/180 |
| 3,802,321 | A | * | 4/1974 | Bosch .................. F01B 3/0064 91/485 |
| 4,477,226 | A | * | 10/1984 | Carreno ................. F01D 5/027 416/144 |
| 5,129,284 | A | | 7/1992 | Brueckner et al. |
| 5,545,010 | A | * | 8/1996 | Cederwall ............ F01D 5/027 415/201 |
| 5,591,008 | A | * | 1/1997 | Wrobel ................ F04D 29/662 416/144 |
| 5,810,527 | A | * | 9/1998 | Jager ...................... B23C 5/006 408/143 |
| 6,220,819 | B1 | | 4/2001 | Chien et al. |
| 7,309,211 | B2 | | 12/2007 | Ellis et al. |
| 7,326,029 | B2 | | 2/2008 | Ahlroth et al. |
| 8,177,487 | B2 | * | 5/2012 | Koza .................... F04D 29/662 415/119 |
| 8,221,070 | B2 | | 7/2012 | Baryshnikov |
| 8,251,674 | B1 | * | 8/2012 | Pairaktaridis ............ H02K 9/06 417/354 |
| 8,801,360 | B2 | | 8/2014 | Sheth et al. |
| 9,260,977 | B2 | | 2/2016 | Milner |
| 9,388,697 | B2 | | 7/2016 | Fernandez et al. |
| 9,689,402 | B2 | | 6/2017 | Elebiary et al. |
| 9,803,654 | B2 | * | 10/2017 | Yagi ........................ F01D 5/04 |
| 9,970,298 | B2 | | 5/2018 | Le Strat et al. |
| 2004/0202539 | A1 | | 10/2004 | Blank et al. |
| 2005/0244272 | A1 | * | 11/2005 | Bruno .................. F01D 5/027 416/144 |
| 2006/0188379 | A1 | * | 8/2006 | Rockarts ................. F02K 3/04 416/248 |
| 2009/0056101 | A1 | * | 3/2009 | Cuddy .................. B23K 26/22 29/456 |
| 2009/0123282 | A1 | * | 5/2009 | Buskirk ................. F01D 5/027 416/1 |
| 2011/0081253 | A1 | * | 4/2011 | Lecuyer ................. F01D 5/027 416/96 R |
| 2012/0163742 | A1 | | 6/2012 | Underbakke et al. |
| 2012/0282082 | A1 | * | 11/2012 | Pichel ..................... F01D 5/027 415/119 |
| 2015/0226233 | A1 | * | 8/2015 | Yagi ........................ F01D 5/027 416/144 |
| 2015/0292331 | A1 | | 10/2015 | Hoff et al. |
| 2015/0315914 | A1 | * | 11/2015 | Nicq ...................... F01D 5/027 416/144 |
| 2015/0337662 | A1 | * | 11/2015 | Bakker .................. B25B 13/481 416/144 |
| 2015/0337663 | A1 | * | 11/2015 | Bakker .................. F01D 5/027 416/144 |
| 2015/0354360 | A1 | | 12/2015 | Le Strat et al. |
| 2016/0326876 | A1 | * | 11/2016 | Lopez ..................... G01M 1/32 |
| 2017/0122339 | A1 | | 5/2017 | Sun et al. |
| 2019/0234216 | A1 | * | 8/2019 | Sishtla ................. F04D 29/051 |

FOREIGN PATENT DOCUMENTS

| | | | | |
|---|---|---|---|---|
| EP | 2520807 | A2 | 11/2012 | |
| EP | 2916010 | A1 | 9/2015 | |
| GB | 2250783 | A * | 6/1992 | .......... F04D 29/281 |
| JP | 2014088803 | A | 5/2017 | |
| RU | 2603382 | C1 | 11/2016 | |
| SU | 1105767 | A1 | 7/1984 | |
| WO | 02097279 | A1 | 12/2002 | |
| WO | WO-02097279 | A1 * | 12/2002 | .............. F16F 15/32 |
| WO | WO-2011157547 | A1 * | 12/2011 | .............. F16F 15/34 |
| WO | WO-2015112344 | A1 * | 7/2015 | ............. F16F 15/322 |

OTHER PUBLICATIONS

Russian Decision to Grant; International Application No. 2019101482/06(002447); International Filing Date: Jan. 18, 2019; dated Feb. 12, 2020; 7 pages.

Russian Office Action; International Application No. 2019101482/06(002447); International Filing Date: Jan. 18, 2019; dated Sep. 25, 2019; 7 pages.

Indian Office Action; International Application No. 201914002322; International Filing Date: Jan. 18, 2019; dated Oct. 29, 2020; 5 pages.

* cited by examiner

HIGH EFFICIENCY CENTRIFUGAL IMPELLER WITH BALANCING WEIGHTS

CROSS-REFERENCE TO RELATED APPLICATIONS

This application claims the benefit of U.S. Provisional Application Ser. No. 62/623,298, filed Jan. 29, 2018, which is incorporated herein by reference in its entirety.

BACKGROUND

Exemplary embodiments disclosed herein related to rotary machines, such as compressors for example, and more particularly, to a system for balancing a rotating component of a rotary machine.

Rotary machines are commonly used in refrigeration and turbine applications. An example of a rotary machine includes a centrifugal compressor having an impeller fixed to a rotating shaft. Rotation of the impeller increases a pressure and/or velocity of a fluid or gas moving across the impeller. During rotation of the impeller, an imbalance of mass may occur such as due to the positional deviation of the impeller relative to the rotor shaft, a manufacturing error at the time of machining, or the like. For example, when the central axis of the mass of the impeller is offset from the rotational center of the rotor shaft, a centrifugal force is generated resulting in a dynamic unbalance.

To prevent or minimize this unbalance and any resulting vibration, a plurality of balance holes having different depths are typically provided in an axial end surface of the impeller to perform balance adjustment. These balance holes may include threaded holes and separate vent holes. Mechanical balancing may be performed by mounting weights in the plurality of threaded holes, and thrust balancing may occur via the passageways defined by the vent holes. This mechanism of mechanical balancing is used to align the center of mass of the impeller with the rotational axis of the rotating shaft.

BRIEF DESCRIPTION

Disclosed is a balancing weight mountable within a balance hole of a rotary component includes a cylindrical body having a desired weight. An opening is formed in a portion of the body to define a hollow passageway and a mechanism couples the cylindrical body within an interior of the balance hole.

In addition to one or more of the features described above, or as an alternative, in further embodiments the opening is formed at a center of the cylindrical body.

In addition to one or more of the features described above, or as an alternative, in further embodiments the opening is formed adjacent to an outer edge of the cylindrical body.

In addition to one or more of the features described above, or as an alternative, in further embodiments the mechanism includes a plurality of male threads formed about an exterior surface of the cylindrical body.

According to another embodiment, a rotating component of a rotary machine includes a hub having a front side and a back side. The hub is rotatable about an axis of rotation. A plurality of balance holes extend from the front side to the back side of the hub. At least one balancing weight is receivable within one of the plurality of balance holes such that both mechanical and thrust balancing are provided at any of the plurality of balance holes.

In addition to one or more of the features described above, or as an alternative, in further embodiments the plurality of balance holes are substantially identical.

In addition to one or more of the features described above, or as an alternative, in further embodiments the plurality of balance holes are spaced circumferentially about a central portion of the hub.

In addition to one or more of the features described above, or as an alternative, in further embodiments the plurality of balance holes are equidistantly spaced circumferentially about a central portion of the hub.

In addition to one or more of the features described above, or as an alternative, in further embodiments the plurality of balance holes are equidistantly radially spaced relative to the axis of rotation.

In addition to one or more of the features described above, or as an alternative, in further embodiments a radial distance of the plurality of holes relative to the axis of rotation varies.

In addition to one or more of the features described above, or as an alternative, in further embodiments the at least one balancing weight is arranged adjacent to a first end of one of the plurality of balancing holes.

In addition to one or more of the features described above, or as an alternative, in further embodiments the at least one balancing weight includes a first balancing weight arranged adjacent to a first end of one of the plurality of balancing holes and a second balancing weight arranged adjacent to a second end of one of the plurality of balancing holes.

In addition to one or more of the features described above, or as an alternative, in further embodiments the at least one balancing weight has a hollow passageway through which a fluid may vent from the front side to the back side of the hub.

In addition to one or more of the features described above, or as an alternative, in further embodiments the hollow passageway is formed at a center of the cylindrical body.

In addition to one or more of the features described above, or as an alternative, in further embodiments the hollow passageway is formed adjacent to an outer edge of the cylindrical body.

In addition to one or more of the features described above, or as an alternative, in further embodiments the at least one balancing weight includes a mechanism for mounting the balancing weight within an interior of one of the plurality of balance holes.

In addition to one or more of the features described above, or as an alternative, in further embodiments the mechanism includes a plurality of male threads formed about an exterior surface of the cylindrical body.

In addition to one or more of the features described above, or as an alternative, in further embodiments the rotating component is an impeller.

In addition to one or more of the features described above, or as an alternative, in further embodiments the rotary machine is a compressor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
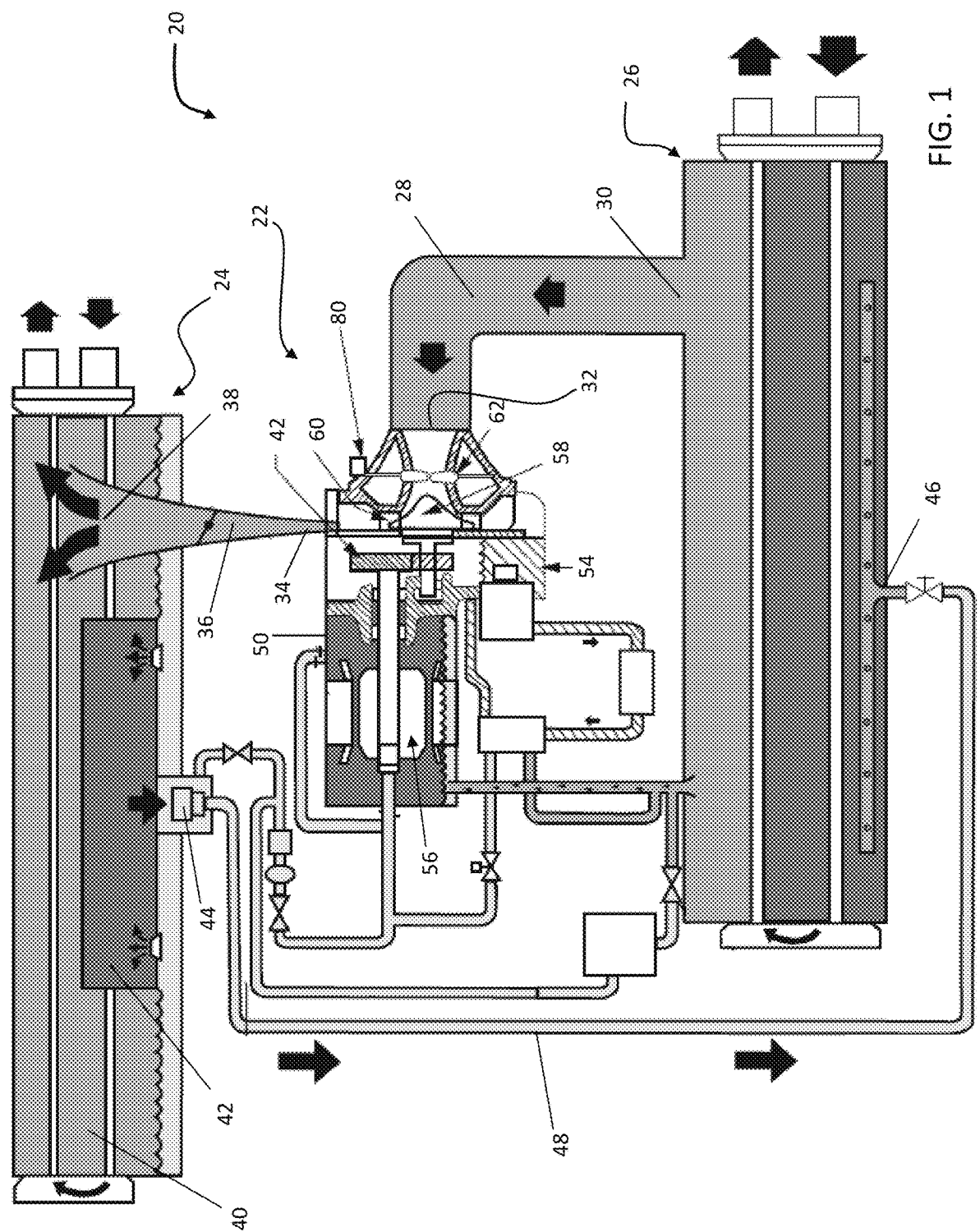
FIG. 1 is cross-sectional diagram of an example of a refrigeration system.

Referring now to FIG. 1, an example of a refrigeration system 20 is illustrated. The refrigeration system 20 includes a compressor assembly 22, a condenser 24, and an evaporator 26 fluidly coupled to form a circuit. A first conduit 28 extends from adjacent the outlet 30 of the evaporator 26 to the inlet 32 of the compressor assembly 22. The outlet 34 of the compressor assembly 30 is coupled by a conduit 36 to an inlet 38 of the condenser 24. In one embodiment, the condenser 24 includes a first chamber 40, and a second chamber 42 accessible only from the interior of the first chamber 40. A float valve 44 within the second chamber 42 is connected to an inlet 46 of the evaporator 26 by another conduit 48.

Depending on the size of the refrigeration system 20, the compressor assembly 22 may include a rotary, screw, centrifugal or reciprocating compressor for small systems, or a screw compressor or centrifugal compressor for larger systems. A typical compressor assembly 22 includes a housing 50 having a motor 52 at one end and a centrifugal compressor 54 at a second, opposite end, with the two being interconnected by a transmission assembly 56. The compressor 54 includes an impeller 58 for accelerating the refrigerant vapor to a high velocity, a diffuser 60 for decelerating the refrigerant to a low velocity while converting kinetic energy to pressure energy, and a discharge plenum (not shown) in the form of a volute or collector to collect the discharge vapor for subsequent flow to a condenser. Positioned near the inlet 32 of the compressor assembly 22 is an inlet guide vane assembly 62. Because a fluid flowing from the evaporator 26 to the compressor 54 must first pass through the inlet guide vane assembly 62 before entering the impeller 58, the inlet guide vane assembly 62 may be used to control the fluid flow into the compressor 54.

The refrigeration cycle within the refrigeration system 20 may be described as follows. The compressor 54 receives a refrigerant vapor from the evaporator 26 and compresses it to a higher temperature and pressure, with the relatively hot vapor then passing into the first chamber 40 of the condenser 24 where it is cooled and condensed to a liquid state by a heat exchange relationship with a cooling medium, such as water or air for example. Because the second chamber 42 has a lower pressure than the first chamber 40, a portion of the liquid refrigerant flashes to vapor, thereby cooling the remaining liquid. The refrigerant vapor within the second chamber 42 is re-condensed by the cool heat exchange medium. The refrigerant liquid then drains into the second chamber 42 located between the first chamber 40 and the evaporator 26. The float valve 44 forms a seal to prevent vapor from the second chamber 42 from entering the evaporator 26.

As the liquid refrigerant passes through the float valve 44, the refrigerant is expanded to a low temperature two phase liquid/vapor state as it passes into the evaporator 26. The evaporator 26 is a heat exchanger which allows heat energy to migrate from a heat exchange medium, such as water for example, to the refrigerant gas. When the gas returns to the compressor 54, the refrigerant is at both the temperature and the pressure at which the refrigeration cycle began.

Figure 2:
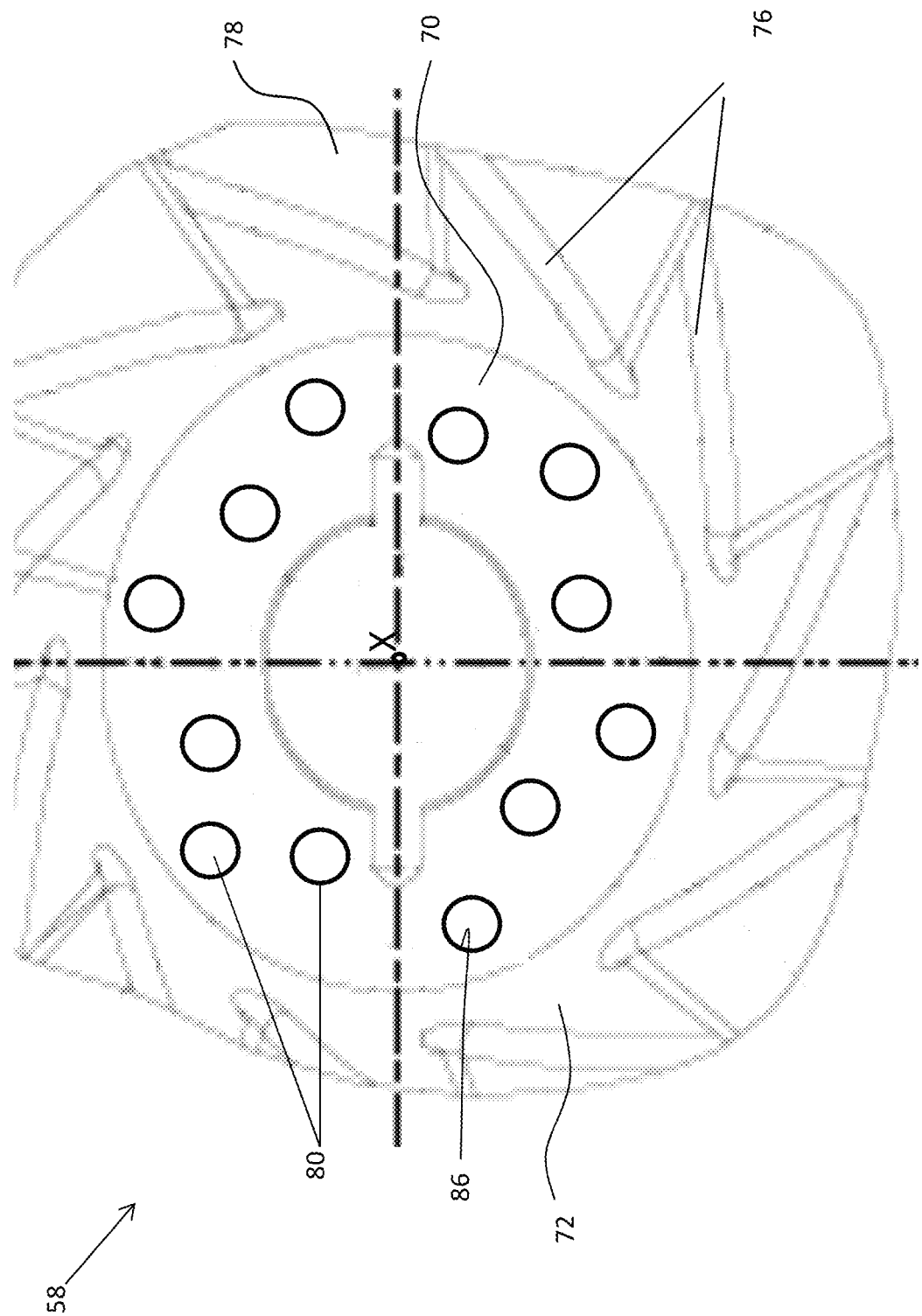
FIG. 2 is a front end view of an impeller of a compressor according to an embodiment.
Figure 3:
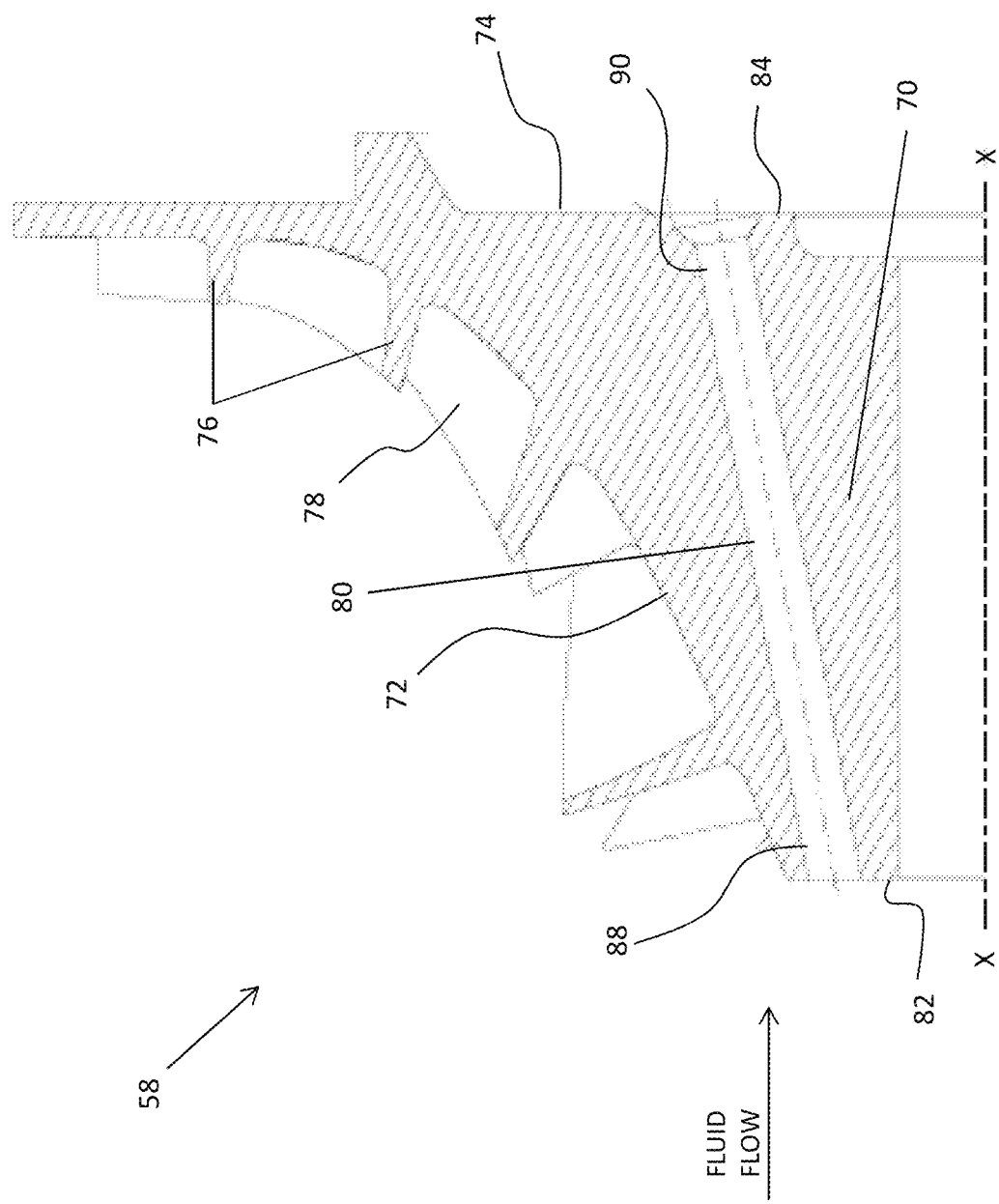
FIG. 3 is a cross-sectional view of an impeller of a compressor according to an embodiment.

With reference now to FIGS. 2 and 3, an example of an impeller, such as impeller 58 of the centrifugal compressor 54 for example, is illustrated in more detail. The impeller 58 includes a hub or body 70 having a front side 72 and a back side 74. As shown, the diameter of the front side 72 of the body 70 generally increases toward the back side 74 such that the impeller 58 is generally conical in shape. A plurality of blades or vanes 76 extends outwardly on the front side 72. In an embodiment, the blades 76 are oriented to discharge a fluid passing over the impeller 58 at an exit angle. As the impeller 58 rotates, fluid approaches the front side 72 of the impeller 58 in a substantially axial direction and flows through the passages 78 defined between adjacent blades 76 in a generally radial direction, oriented substantially perpendicular to the axis of rotation of the impeller 58.

A plurality of balance holes 80 having a predetermined axial depth are formed in the central portion of the hub 70. In an embodiment, the balance holes 80 extend from a first end 82 to a second opposite end 84 of the body 70. However, embodiments where one or more of the balance holes 80 only extend through a portion of the axial depth of the hub 70 are also contemplated herein. Further, the balance holes 80 may extend generally parallel to the axis of rotation X, or alternatively, may be arranged at an angle to the axis of rotation, as shown in FIG. 3.

The plurality of balance holes 80 may include any number of balance holes spaced circumferentially about the hub 70. In an embodiment, each of the plurality of balance holes 80 is equidistantly distributed about the circumference of the hub 70. However, embodiments where the balance holes 80 are non-uniformly positioned about the circumference of the hub 70 are also contemplated herein. In addition, the balance holes 80 may be arranged at the same radial position, or at various radial positions, relative to the rotational axis X of the hub 70. For example, the plurality of balance holes 80 may be arranged in one or more rows or circles about the periphery of the end surface 82 of the hub 70. In the illustrated, non-limiting embodiment, each of the rows of balance holes 80 has a different radius.

The plurality of balance holes 80 are substantially identical, and therefore have a uniform inner diameter. All or a portion of the inner peripheral surface 86 of the plurality of balance holes 80 may have a female thread formed therein to enable a balancing weight having a complementary male thread to be coupled thereto. For example, the first end 88 of one or more of the plurality of balance holes 80, located adjacent the front side 82 of the hub 70, may include a female thread for receiving a threaded balancing weight. Alternatively, or in addition, a second end 90 of one or more of the plurality of balance holes 80, located adjacent the back side 74 of the hub 70, may have a female thread formed therein.

Figure 4:
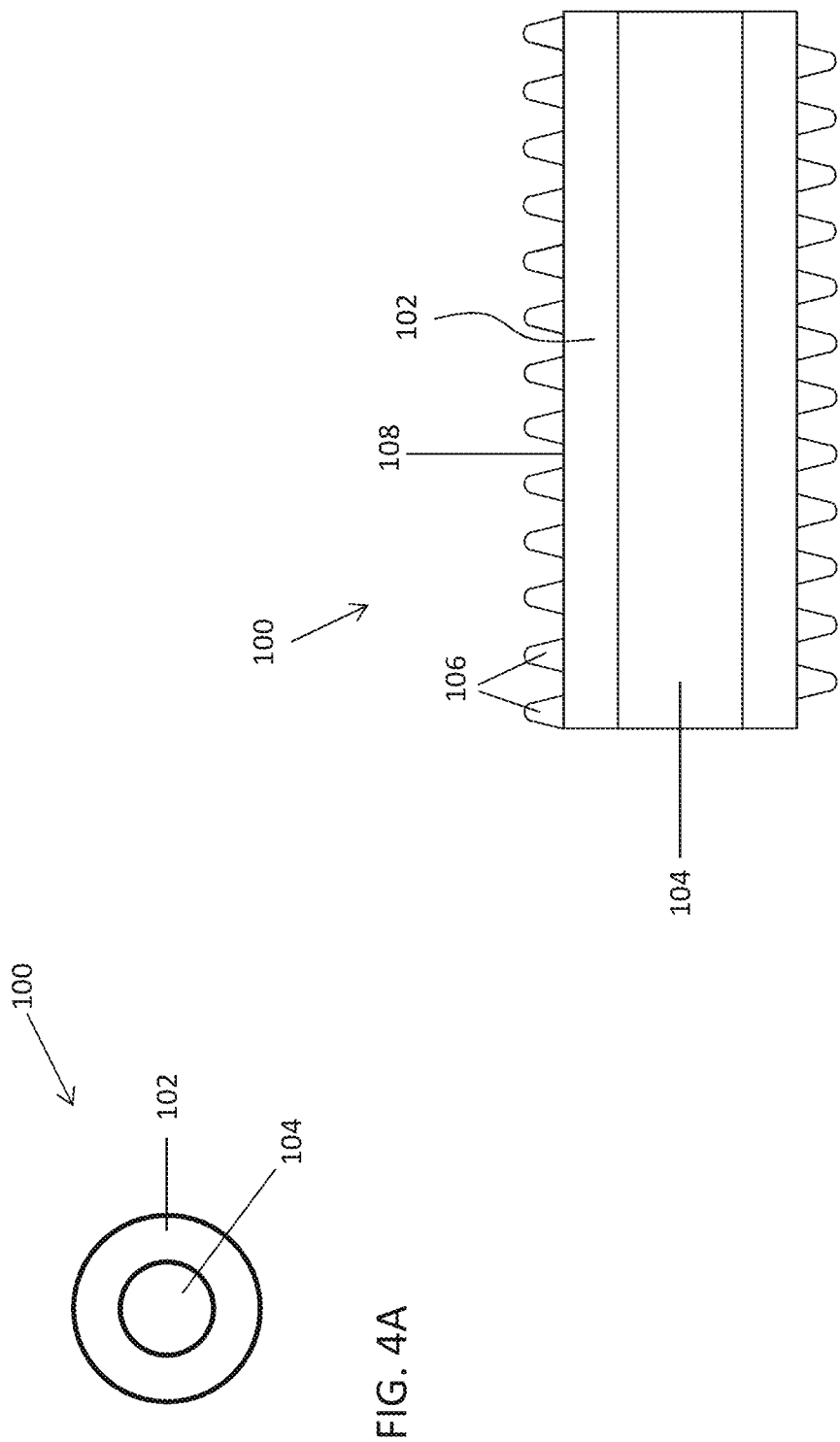
FIG. 4A is an end view of a balancing weight receivable within a balance hole of an impeller according to an embodiment.
FIG. 4B is a cross-sectional view of a balancing weight receivable within a balance hole of an impeller according to an embodiment.

With reference now to FIGS. 4A and 4B, an example of a balancing weight 100 mountable within a portion of one of the plurality of balance holes 80 is illustrated. As shown, the balancing weight 100 has a generally cylindrical body 102. The body 102 may be formed from any suitable material having a desired weight. The balancing weight 100 additionally includes an opening of hollow passageway 104 through which a fluid may flow. In the illustrated, non-limiting embodiment, the opening or hollow passageway 104 is formed through a center of the cylindrical body 102. However, embodiments where the passageway 104 is formed at another portion of the cylindrical body 102, such as adjacent the outer periphery thereof for example, are also considered within the scope of the disclosure.

An outer diameter of the balancing weight 100 is generally equal to the inner diameter of the plurality of balance holes 80. In an embodiment, a plurality of male threads 106 wrap about an exterior surface 108 of the balancing weight 100. The threads 106 are complementary to and are configured to rotatably engage with the plurality of female threads formed in about the inner peripheral surface 86 of any of the plurality of balance holes 80, to couple the balancing weight 100 to the impeller hub 70 at a desired position. It should be understood that the plurality of threads 106 illustrated and described herein with respect to mounting the balancing weight 100 within a balance hole 80 are intended as an example only and that in other embodiments, other mechanisms or fasteners for installing the balancing weight 100 may be used.

Figure 5:
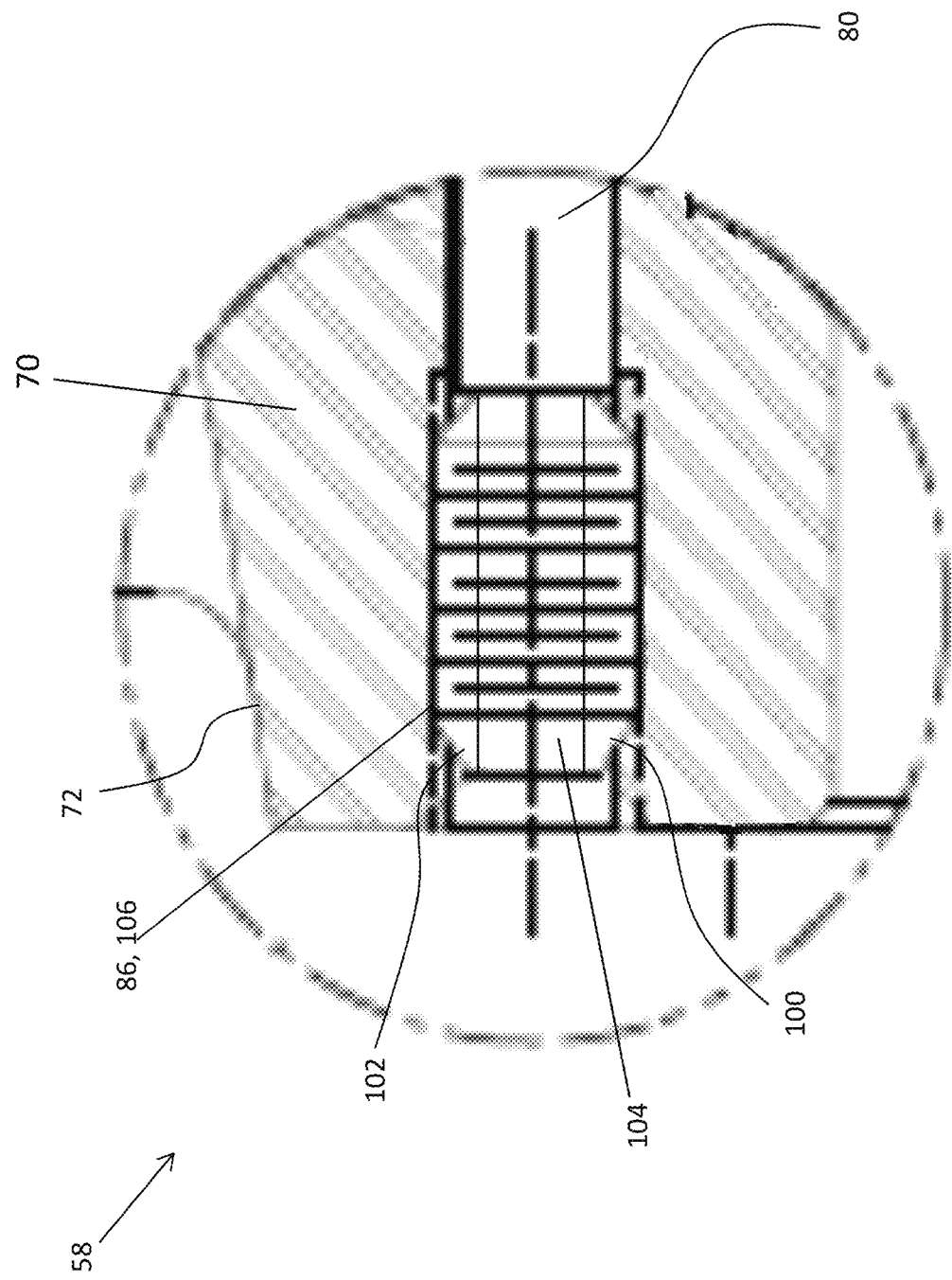
FIG. 5 is a cross-sectional view of an impeller including a balancing weight according to an embodiment.

Any number of balancing weights 100 may be mounted within the plurality of balance holes 80 formed in the impeller hub 70 to balance the center of mass of the hub 70 with the axis of rotation X. In embodiments where multiple balancing weights 100 are used, the weight of each of balancing weight 100 mounted to the hub 70 may vary. During rotation of an impeller 58 having one or more balancing weights 100 installed within one or more of the balance holes 80, the fluid drawn by impeller 58 will flow axially over the front side 72 of the impeller 58. As best shown in FIG. 5, the hollow passageway 104 of the one or more balancing weights 100 is arranged in fluid communication with each balance hole 80, such that a fluid may pass from the back side 74 of the hub to the front side 82 via the balance hole 80 and the hollow passageway 104 formed in the balancing weight 100.

Accordingly, an impeller hub 70, as described herein, no longer requires separate and distinct holes for receiving weights and holes that allow a fluid to vent there through. Rather, a single balance hole 80 is configured to perform both functions by using a balancing weight 100 that has an open passageway 104 when installed within the balance hole 80. By reducing the total number of openings formed in the impeller hub 70, the diameter of the impeller hub and corresponding shroud may be decreased, thereby increasing the efficiency of the compressor.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A balancing weight mountable within a balance hole of a rotary component, the rotary component having an axis of rotation, comprising:
    a cylindrical body having a predetermined weight and an axial length defined between a first end and a second opposite end of the cylindrical body;
    an opening formed in a portion of the body to define a fluid flow path extending between the first end and the second end; and
    a mechanism extending over the axial length of the body, the mechanism being operable to locate the entire cylindrical body within an interior of the balance hole, wherein when the balancing weight is mounted to the rotary component, the fluid flow path is arranged at a non-parallel angle relative to the axis of rotation.

2. The balancing weight of claim 1, wherein the opening is formed at a center of the cylindrical body.

3. The balancing weight of claim 1, wherein the opening is formed adjacent to an outer edge of the cylindrical body.

4. The balancing weight of claim 1, wherein the mechanism includes a plurality of male threads formed about an exterior surface of the cylindrical body.

5. A rotating component of a rotary machine, comprising:
    a hub rotatable about an axis of rotation, the hub having a front side and a back side, the front side being spaced from the back side along the axis of rotation;
    a plurality of balance holes extending from the front side to the back side, wherein at least one balance hole of the plurality of balance holes is arranged at a non-parallel angle relative to the axis of rotation; and
    a balancing weight entirely receivable within the at least one balancing hole of the plurality of balance holes, such that both mechanical and thrust balancing are provided at the at least one balance hole, wherein a configuration of the at least one balancing weight is substantially uniform over an axial length of the at last one balancing weight.

6. The rotating component of claim 5, wherein the plurality of balance holes are substantially identical.

7. The rotating component of claim 5, wherein the plurality of balance holes are spaced circumferentially about a central portion of the hub.

8. The rotating component of claim 7, wherein the plurality of balance holes are equidistantly spaced circumferentially about a central portion of the hub.

9. The rotating component of claim 7, wherein the plurality of balance holes are equidistantly radially spaced relative to the axis of rotation.

10. The rotating component of claim 7, wherein a radial distance of each of the plurality of holes relative to the axis of rotation varies.

11. The rotating component of claim 5, wherein the at least one balancing weight is arranged adjacent to a first end of one of the plurality of balancing holes.

12. The rotating component of claim 5, wherein the at least one balancing weight includes a first balancing weight arranged adjacent to a first end of one of the plurality of balancing holes and a second balancing weight arranged adjacent to a second end of one of the plurality of balancing holes.

13. The rotating component of claim 5, wherein the at least one balancing weight has a hollow passageway through which a fluid may vent from the front side to the back side of the hub.

14. The rotating component of claim 13, wherein the hollow passageway is formed at a center of the cylindrical body.

15. The rotating component of claim 13, wherein the hollow passageway is formed adjacent to an outer edge of the cylindrical body.

16. The rotating component of claim 5, wherein the at least one balancing weight includes a mechanism for mounting the balancing weight within an interior of one of the plurality of balance holes.

17. The rotating component of claim 16, wherein the mechanism includes a plurality of male threads formed about an exterior surface of the cylindrical body.

18. The rotating component of claim 5, wherein the rotating component is an impeller.

19. The rotating component of claim 18, wherein the rotary machine is a compressor.

\* \* \* \* \*